United States Patent
Hall et al.

(10) Patent No.: US 10,214,958 B2
(45) Date of Patent: Feb. 26, 2019

(54) CUSTOMIZABLE GLASS WALL SYSTEM

(71) Applicants: David R. Hall, Provo, UT (US); Andrew Priddis, Mapleton, UT (US); Sigmar Tobias, Orem, UT (US); Benjamin Taylor, Provo, UT (US); Dylan Astle, Provo, UT (US); Grant Getts, Provo, UT (US); Thomas Tolman, Livingston, TX (US)

(72) Inventors: David R. Hall, Provo, UT (US); Andrew Priddis, Mapleton, UT (US); Sigmar Tobias, Orem, UT (US); Benjamin Taylor, Provo, UT (US); Dylan Astle, Provo, UT (US); Grant Getts, Provo, UT (US); Thomas Tolman, Livingston, TX (US)

(73) Assignee: Hall Labs LLC, Provo, UT (US)

( * ) Notice: Subject to any disclaimer, the term of this patent is extended or adjusted under 35 U.S.C. 154(b) by 121 days.

(21) Appl. No.: 15/378,682

(22) Filed: Dec. 14, 2016

(65) Prior Publication Data

US 2018/0163461 A1    Jun. 14, 2018

(51) Int. Cl.
| | |
|---|---|
| *E06B 9/264* | (2006.01) |
| *E06B 9/72* | (2006.01) |
| *E06B 9/42* | (2006.01) |
| *E06B 3/67* | (2006.01) |
| *E06B 3/66* | (2006.01) |
| *E06B 5/10* | (2006.01) |
| *E06B 9/24* | (2006.01) |

(52) U.S. Cl.
CPC ............ *E06B 9/264* (2013.01); *E06B 3/6612* (2013.01); *E06B 3/6707* (2013.01); *E06B 3/6715* (2013.01); *E06B 5/10* (2013.01); *E06B 9/42* (2013.01); *E06B 9/72* (2013.01); *E06B 2009/2452* (2013.01); *E06B 2009/2476* (2013.01); *E06B 2009/2643* (2013.01)

(58) Field of Classification Search
CPC ...... E06B 9/264; E06B 3/6612; E06B 3/6707; E06B 3/67; E06B 3/6715; E06B 5/10; E06B 9/42; E06B 9/44; E06B 2009/2643
USPC .................................... 160/107, 90, 98, 331
See application file for complete search history.

(56) References Cited

U.S. PATENT DOCUMENTS

| | | | | |
|---|---|---|---|---|
| 3,186,473 A | * | 6/1965 | Myers ..................... | A47H 23/06 160/241 |
| 5,467,266 A | * | 11/1995 | Jacobs ................... | B60J 1/2016 160/1 |

(Continued)

*Primary Examiner* — Beth A Stephan

(57) ABSTRACT

A customizable glass wall system is disclosed. The system comprises at least two glazed, transparent panes mounted to a frame, which is preferably less than five inches thick. The frame includes a removable headboard whereon multiple rollers are mounted. A film is attached to each of the rollers. The films can be selectively extended and retracted behind the transparent panes in the glass wall system by means of the rollers. Each of the films can be controlled individually by a motor driving each of the rollers. The films can be arranged in any combination to perform various functions, but most importantly, to allow various amounts and types of light to pass through the window system in order to control the thermal insulation of the glass wall system. The system can be automated based on time, amount of sunlight, weather, temperature, and user preference.

20 Claims, 10 Drawing Sheets

(56) References Cited

U.S. PATENT DOCUMENTS

| | | | | |
|---|---|---|---|---|
| 5,996,668 A * | 12/1999 | DeBlock | ............ | E06B 9/327 |
| | | | | 160/107 |
| 6,089,301 A * | 7/2000 | Smith | ............ | E06B 9/04 |
| | | | | 160/368.1 |
| 6,736,185 B2 * | 5/2004 | Smith | ............ | E06B 9/264 |
| | | | | 160/107 |
| 7,234,501 B1 * | 6/2007 | Park | ............ | E06B 9/264 |
| | | | | 160/107 |
| 9,169,690 B2 * | 10/2015 | Blair | ............ | E06B 9/24 |
| 9,976,344 B2 * | 5/2018 | Nicolosi | ............ | E06B 9/307 |
| 2004/0020606 A1 * | 2/2004 | Nicolosi | ............ | E06B 9/264 |
| | | | | 160/107 |
| 2005/0287295 A1 * | 12/2005 | Papp | ............ | C23C 14/044 |
| | | | | 427/248.1 |
| 2007/0068635 A1 * | 3/2007 | Nicolosi | ............ | E06B 9/264 |
| | | | | 160/98 |
| 2007/0144684 A1 * | 6/2007 | Hutchings | ............ | E06B 7/30 |
| | | | | 160/107 |
| 2007/0277937 A1 * | 12/2007 | Su | ............ | E06B 9/264 |
| | | | | 160/98 |
| 2008/0053628 A1 * | 3/2008 | Anderson | ............ | E06B 9/264 |
| | | | | 160/238 |
| 2010/0307698 A1 * | 12/2010 | Perkowitz | ............ | A47H 2/00 |
| | | | | 160/108 |
| 2012/0132374 A1 * | 5/2012 | Lee | ............ | E06B 9/264 |
| | | | | 160/98 |
| 2012/0168095 A1 * | 7/2012 | Augustyniak | ............ | E06B 9/262 |
| | | | | 160/84.05 |
| 2013/0139976 A1 * | 6/2013 | Carvallo | ............ | E06B 9/24 |
| | | | | 160/90 |
| 2014/0209746 A1 * | 7/2014 | Dunn | ............ | B60J 1/2019 |
| | | | | 244/129.3 |

\* cited by examiner

CUSTOMIZABLE GLASS WALL SYSTEM

CROSS-REFERENCES

Technical Field

This invention relates generally to the field of building structures, and more specifically to glass walls.

Background

Architects have long integrated transparent materials, such as glass, into building designs, whether using them for windows or walls, for a variety of reasons. Some reasons include that buildings that incorporate glass or other transparent materials in their exterior walls are visually appealing to outside viewers. Furthermore, they provide light, warmth, and an unobstructed view of surroundings to inside viewers. These features have driven construction designs to increasingly incorporate glass.

However, using glass, especially for exterior walls, has several drawbacks. First, glass has a lower insulation value than most other building materials used in exterior walls. Also, glass allows radiative energy to pass through it more easily than most other building materials.

For these reasons, a large variety of methods have been developed to improve the thermal resistance qualities of glass used in walls and windows. Some of these methods involve window coverings, which are able to be extended and retracted to cover or uncover the glass in an effort to achieve desired amounts of light and heat transfer. For example, Venetian blinds can be adjusted to allow varying amounts of light to pass through. Roller shades can be moved up and down to control how much light enters. Some inventions incorporate both Venetian blinds and roller shades to gain even more customization. Other methods use multiple layers of glass panes with air pockets in between. Still other methods utilize films that can be stuck to the window panes. These and other inventions provide only limited customization of heat and light passage through the glass.

In light of the foregoing, what is needed is a glass wall system that improves the thermal insulation properties of transparent building materials, but also improves the customization of light and heat passage by utilizing all of the above methods, and others, under the customized control of a user.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow for a thermally insulative and highly customizable glass wall system.

Consistent with the foregoing, a system is disclosed. The system comprises a frame comprising a removable headboard. At least two glazed, transparent panes are mounted to the frame, defining an interior space within the frame. The system further comprises a plurality of rollers comprising motors mounted to the removable headboard. A film is attached to each of the plurality of rollers such that when the plurality of rollers are selectively actuated, the films are selectively disposed within the interior space within the frame, juxtaposed behind the at least two glazed, transparent panes.

In some embodiments, the glazed, transparent panes comprise glass. The glazed, transparent panes may have a low-E coating or a sealed gap between panes filled with a noble gas or a vacuum. In some embodiments, the films block various amounts of visible light, infrared radiation, or ultraviolet radiation. In other embodiments, the films comprise movie screens, white board films, decorative films, ballistic films, or soundproofing films. Some embodiments further comprise vertical tracks that align the films.

In different embodiments, the rollers are actuated automatically or by a user based on variables of time, amount of sunlight, weather, temperature, and user preference. Some embodiments comprise a window covering, such as blinds, shutters, or shades, that may be actuated in like manner to the rollers. Still other embodiments comprise solar cells, which can be used to power the system. In a preferred embodiment, the frame is less than approximately five inches thick.

BRIEF DESCRIPTION OF THE DRAWINGS

A more particular description of the invention briefly described above is made below by reference to specific embodiments depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
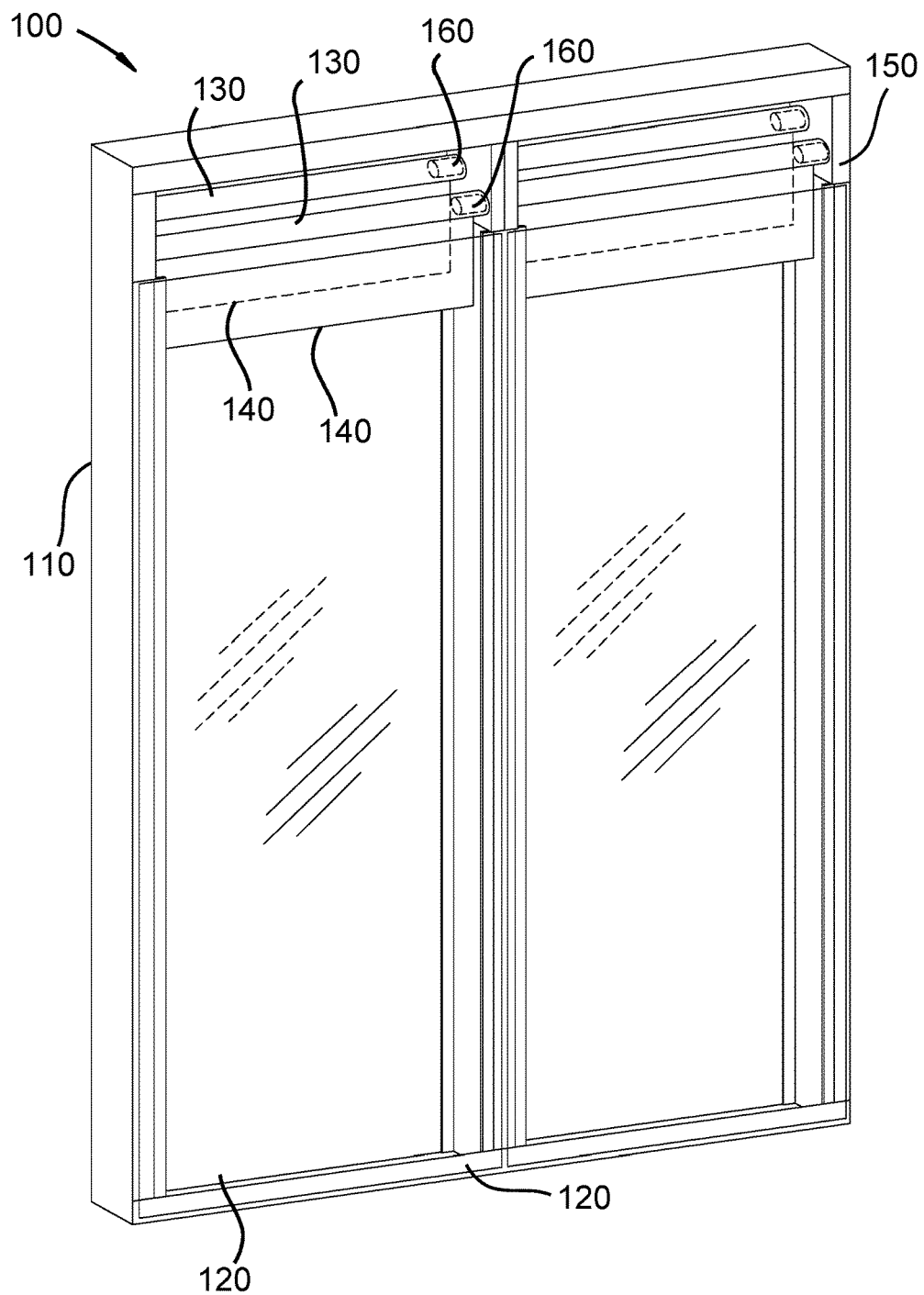
FIG. 1 depicts one embodiment of the invented system.

FIG. 1 depicts one embodiment of a system 100 comprising a frame 110, which comprises a removable headboard 150; at least two glazed, transparent panes 120 mounted to the frame 110, defining an interior space within the frame 110; a plurality of rollers 130, which comprise motors 160, mounted to the removable headboard 150; and a film 140 attached to each of the plurality of rollers 130 such that when the plurality of rollers 130 are selectively actuated, the films 140 are selectively disposed within the interior space within the frame 110, juxtaposed behind the at least two glazed, transparent panes 120.

Figure 2:
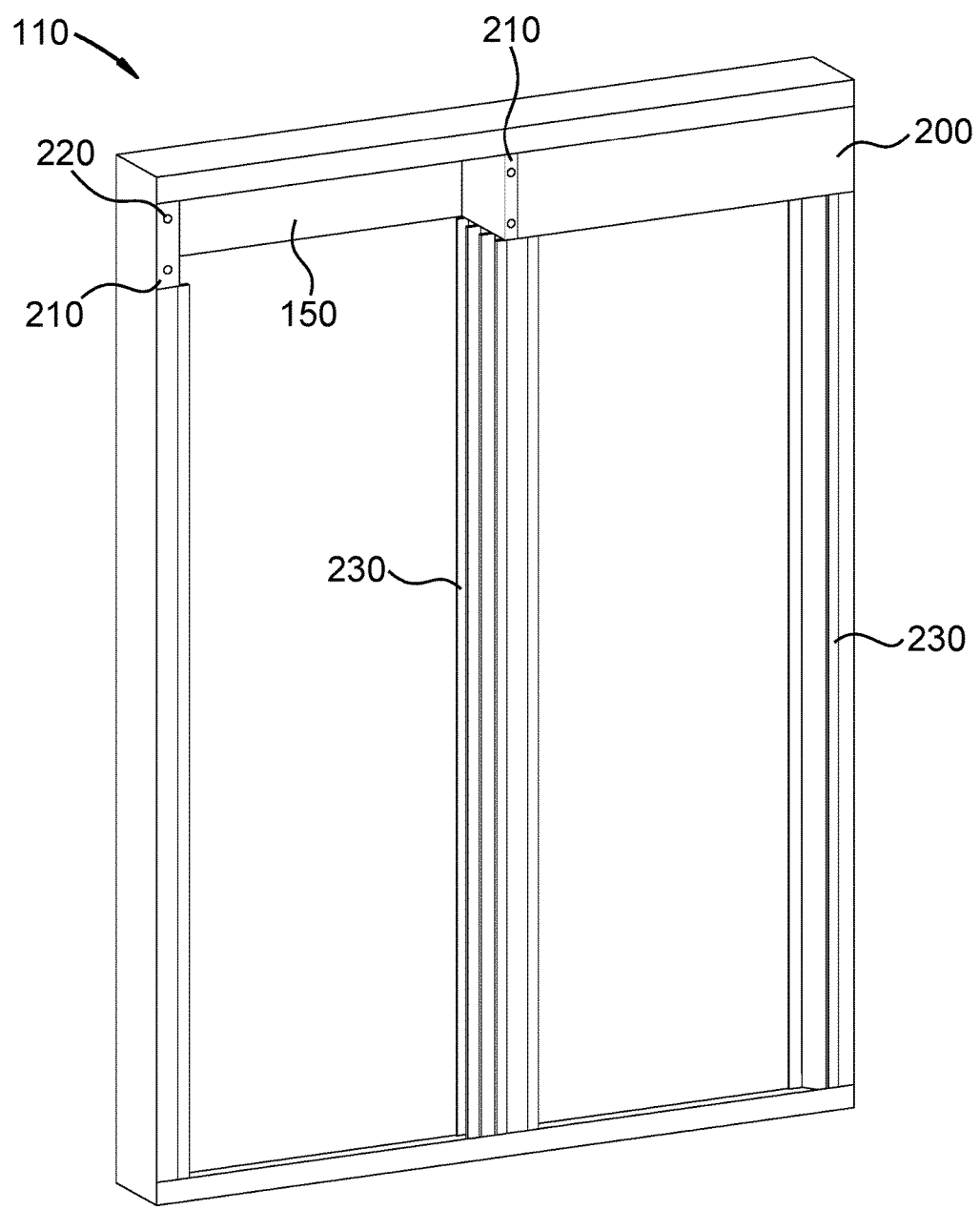
FIG. 2 depicts one embodiment of a frame.

FIG. 2 depicts one embodiment of a frame 110. The frame 110 may comprise a window frame or a wall frame. In a preferred embodiment, the frame 110 is in a rectangular configuration. In other embodiments, the frame 110 has other geometrical configurations. The frame 110 may be found in variable sizes. In a preferred embodiment, the frame 110 is less than approximately five inches thick, preferably approximately four and one-half inches thick, which is the standard thickness of a wall built with traditional materials. This allows the frame 110 to be integrated into a traditional building structure in the form of a wall or window. In a preferred embodiment, the frame 110 measures approximately four feet wide and fourteen feet high. In a preferred embodiment, the frame 110 comprises steel. In other embodiments, the frame 110 comprises other metal materials, wood, or engineered wood products. The frame 110 comprises a removable headboard 150. In a preferred embodiment, the removable headboard 150 comprises a thin sheet of steel. In a preferred embodiment, the removable headboard 150 is in the configuration of an open-sided rectangle, shaped and sized to fit securely inside the frame 110, with two flanges 210 protruding from the open side. The two flanges 210 are used to mount the removable headboard 150 to the frame 110. The removable headboard 150 serves several functions. The removable headboard 150 fills an aesthetic function, in that it blocks the plurality of rollers 130, as well as controllers, blinds, or other items stored within the removable headboard 150, from view when looking through from an outer side of the system 100. In a preferred embodiment, the frame 110 also comprises a removable cover 200 to block the items stored within the removable headboard 150 from view when looking from the opposite inner side of the system 100. In addition, the plurality of rollers 130 are mounted to the removable headboard 150. In one embodiment, one or more window coverings are also mounted to the removable headboard 150. Because the removable headboard 150 is removable, in the event that one of the plurality of rollers 130 or window coverings malfunctions, the removable headboard 150 can be easily removed to a more convenient location so that the malfunctioning one of the plurality of rollers 130 or window coverings can be easily replaced. In one embodiment, the removable headboard 150 is mounted to the frame 110 by means of connectors 220, such as screws, bolts, nails, or other connectors well known by those skilled in the art. The connectors 220 should be easy to remove. In one embodiment, the frame 110 comprises vertical tracks 230. The vertical tracks 230 are used to align each film 140 attached to each of the plurality of rollers 130. Each film 140 unrolls and extends downward, an edge of the film 140 running along inside the vertical tracks 230 so that the film 140 is secured in place. Different embodiments may have a different number of vertical tracks 230, the number of vertical tracks 230 corresponding to the number of films 140 in the system 100. FIG. 2 depicts two embodiments of vertical tracks 230, one set of vertical tracks 230 having two tracks, and one set having four tracks.

Figure 3:
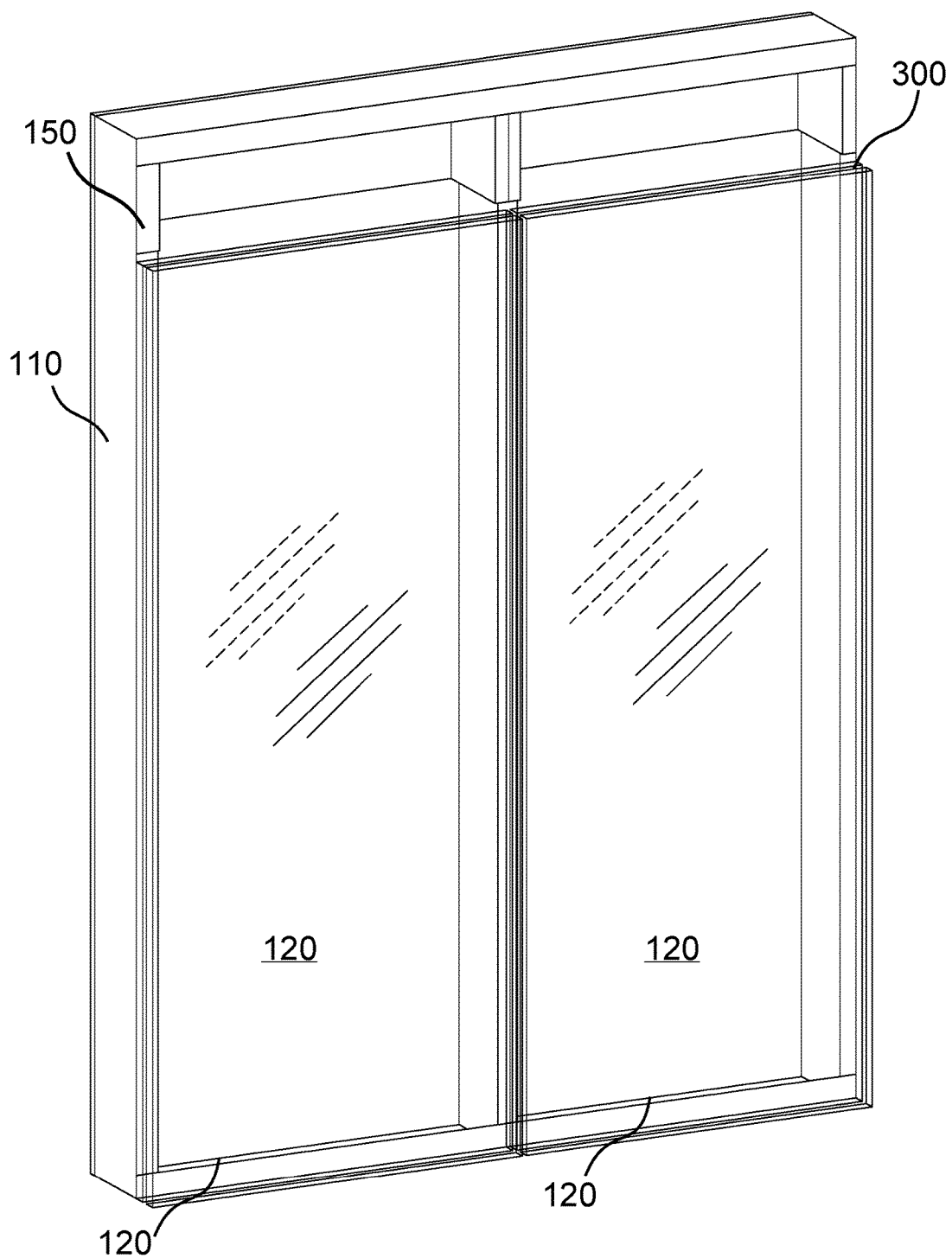
FIG. 3 depicts at least two glazed, transparent panes mounted to the frame, defining an interior space within the frame.

FIG. 3 depicts at least two glazed, transparent panes 120 mounted to the frame 110, defining an interior space within the frame 110. In a preferred embodiment, the at least two glazed, transparent panes 120 comprise glass. In other embodiments, the at least two glazed, transparent panes 120 comprise one of a variety of plastics, such as polycarbonates or acrylics. In a preferred embodiment, the at least two glazed, transparent panes 120 comprise low-E coating. Low-E coating minimizes the amount of infrared and ultraviolet radiation that can pass through the glazed, transparent panes 120. In other embodiments, the glazed, transparent panes 120 are glazed with water repellent, residue resistant, scratch resistant, or antistatic coatings. In one embodiment, the at least two glazed, transparent panes 120 comprise at least one double-pane or at least one triple-pane comprising a sealed gap 300 between panes of the double-pane or triple-pane. In a preferred embodiment, one glazed, transparent pane 120 that faces outside comprises a double-pane, and one glazed, transparent pane 120 that faces inside comprises a single pane. (This is opposite of the depiction in FIG. 3, in which a pane facing outside is a single pane, and a pane facing inside is a double pane, due to the difficulty of being able to appropriately label a view of the preferred embodiment.) In other embodiments, both inside-facing and outside-facing glazed, transparent panes 120 comprise double-panes or triple-panes. In one embodiment, the sealed gap 300 between panes of the double-panes or triple-panes comprises argon or krypton. In another embodiment, the sealed gap 300 comprises a vacuum. The at least two glazed, transparent panes 120 are mounted to the frame 110. In one embodiment, the glazed, transparent panes 120 are mounted to the frame 110 by means of resting on a protruding ledge and attaching with tape and glue. Other means of mounting commonly known in the art may be used. In a preferred embodiment, at least one glazed, transparent pane 120 is mounted to one side of the frame 110 facing outside, the at least one glazed, transparent pane 120 having a shape and size that extends over the entire outside-facing side of the frame 110. At least one glazed, transparent pane 120 is mounted to an opposite side of the frame 110 facing inside, the at least one glazed, transparent pane 120 having a shape and size that extends nearly over the entire inside-facing side of the frame 110, but cutting off underneath the headboard 150. The at least two glazed, transparent panes 120 mounted to the frame 110 define an interior space within the frame 110. In a preferred embodiment, the interior space within the frame 110 measures less than approximately five inches in depth. The interior space is used for disposing the films 140 or blinds to vary the properties of the glazed, transparent panes 120. For example, some films 140 block the light or energy that passes through the glazed, transparent panes 120. Other films 140 vary the utility of the glazed, transparent panes 120.

Figure 4A:
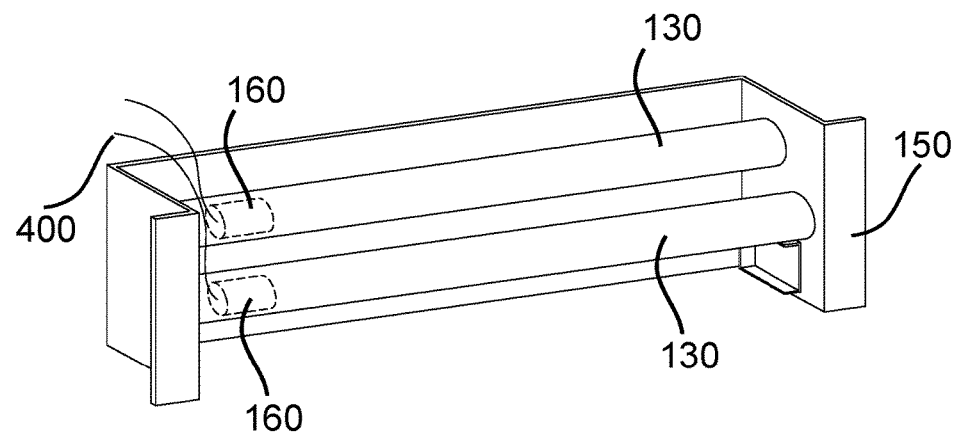
FIG. 4A depicts a plurality of rollers comprising motors mounted to the removable headboard.
Figure 4B:
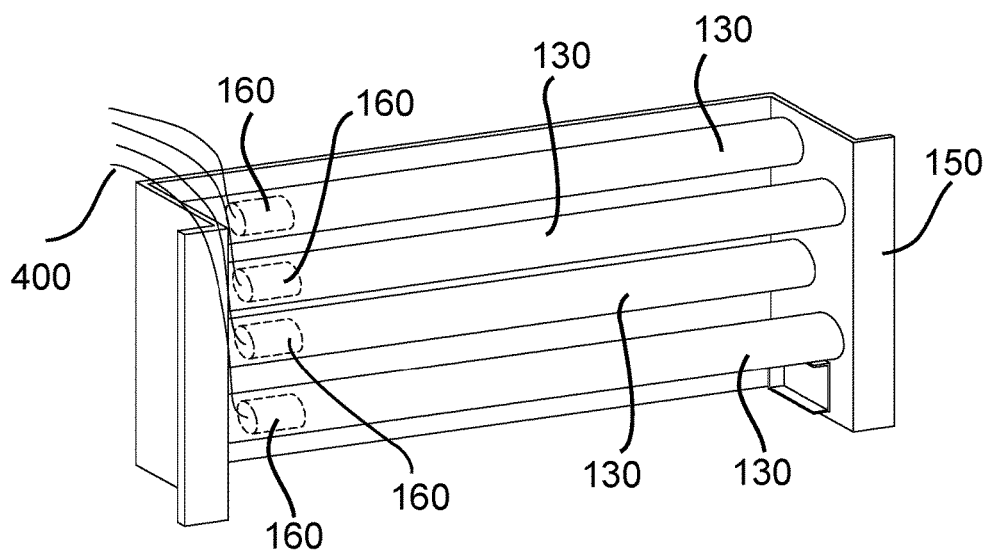
FIG. 4B depicts a plurality of rollers comprising motors mounted to the removable headboard.

FIG. 4A and FIG. 4B depict a plurality of rollers 130 comprising motors 160 mounted to the removable headboard 150. Because the removable headboard 150 is removable, in the event that one of the plurality of rollers 130 malfunctions, the removable headboard 150 can be easily removed to a more convenient location so that the malfunctioning one of the plurality of rollers 130 can be easily replaced. In a preferred embodiment, each roller 130 extends the width of the removable headboard 150, which extends the width of the frame 110, and each roller 130 is mounted to the removable headboard 150 by means of connectors attached through the two ends of the roller 130. The connectors can be removed in order to remove a roller 130 when necessary. The plurality of rollers 130 are each attached to a film 140. The number of rollers 130 in the system 100 corresponds to the number of desired films 140. The system 100 has the capacity to hold numerous rollers 130. However, a larger number of rollers 130 may necessitate a larger removable headboard 150 and a larger number of slots in the vertical tracks 230. In a preferred embodiment, there are two rollers 130. This embodiment is depicted in FIG. 4A. FIG. 4B depicts another embodiment with more than two rollers 130. In a preferred embodiment, each roller 130 is attached to the removable headboard 150 in an ascending vertical pattern, each roller 130 stacked higher than the last and slightly offset to make room for all desired films 140. In another embodiment, the plurality of rollers 130 are lined up horizontally. In a preferred embodiment, the plurality of rollers 130 comprise plastic. In other embodiments, the plurality of rollers 130 comprise metal, fiberglass, wood, or other non-pliable materials. In a preferred embodiment, the plurality of rollers 130 are hollow. The plurality of rollers 130 comprise motors 160. In a preferred embodiment, each roller 130 comprises one motor 160. In a preferred embodiment, one motor 160 is placed within the hollow space inside each roller 130. When the motor 160 is actuated, the motor 160 rotates, causing the roller 130 to rotate with it. In a preferred embodiment, there are two rollers 130 and each motor 160 therein rotates in an opposite direction in order to maximize the amount of room available between films 140 in the interior space within the frame 110. In a preferred embodiment, each motor 160 is connected to a central controller. The central controller automates the rollers 130 or controls them by user input. The motors 160 are powered by battery or solar cells in some embodiments. In other embodiments, the motors 160 are connected to electrical power. In one embodiment, wires 400 run through the frame 110 to connect the motors 160 to electrical power.

Figure 5A:
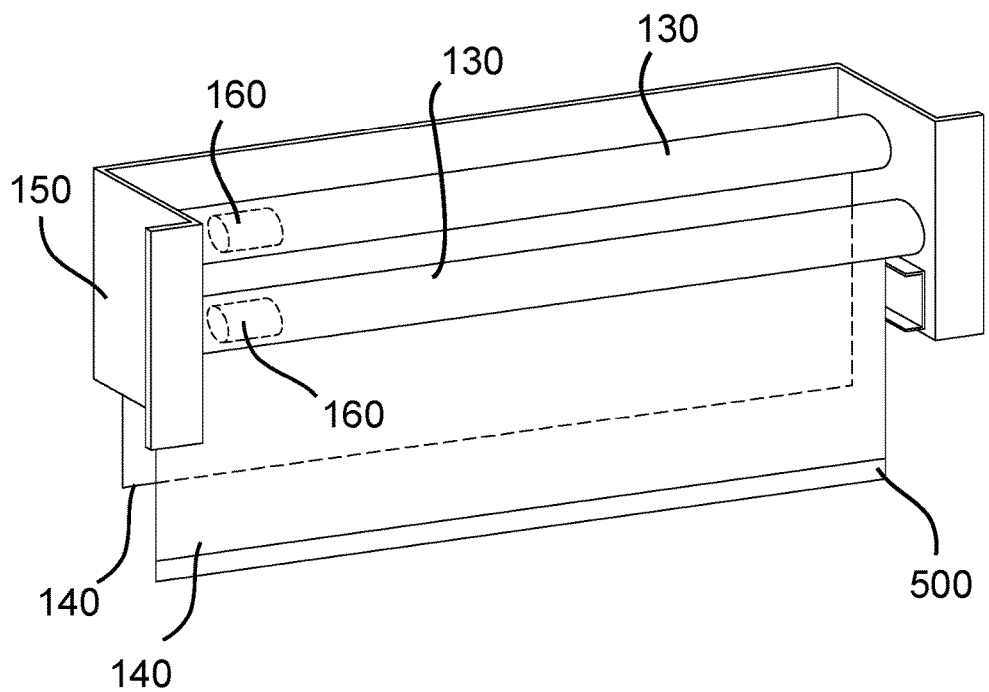
FIG. 5A depicts a film attached to each of the plurality of rollers.

FIG. 5A depicts a film 140 attached to each of the plurality of rollers 130. A film 140 is a thin sheet of a given material. In a preferred embodiment, each of the rollers 130 is attached to one film 140. The number of rollers 130 in the system 100 is equal to the number of desired films 140. The system 100 has the capacity to hold numerous rollers 130 and films 140. However, a larger number of rollers 130 and films 140 may necessitate a larger removable headboard 150 and a larger number of slots in the vertical tracks 230 in certain embodiments. In a preferred embodiment, there are two rollers 130 and two films 140. In one embodiment, the films 140 comprise films that block fixed percentages of visible light. For example, one film, a blackout screen blocks all visible light. Another film has an electrical current that allows a user to vary the percentage of visible light that can penetrate the film. In another embodiment, the films 140 comprise films that partially or entirely block infrared radiation. For example, one film particularly blocks short wavelength radiation. In another embodiment, the films 140 comprise films that partially or entirely block ultraviolet radiation. In other embodiments, the films 140 comprise movie screens, whiteboard films, or decorative films, ballistic films, or sound proofing films. In another embodiment, the films 140 are flexible steel sheets with solar cells. In a preferred embodiment, there are two films 140 in the system 100, one being a blackout screen, and one being a film that blocks short-wave infrared radiation. In a preferred embodiment, each film 140 is in the configuration and size of the frame 110. Each film 140 is flexible such that it can be rolled down into the interior space within the frame 110 and rolled back up around a roller 130. In a preferred embodiment, each film 140 has a thin sheet of metal 500 attached along the bottom perimeter to give the film weight so that it will be pulled down securely and evenly.

Figure 5B:
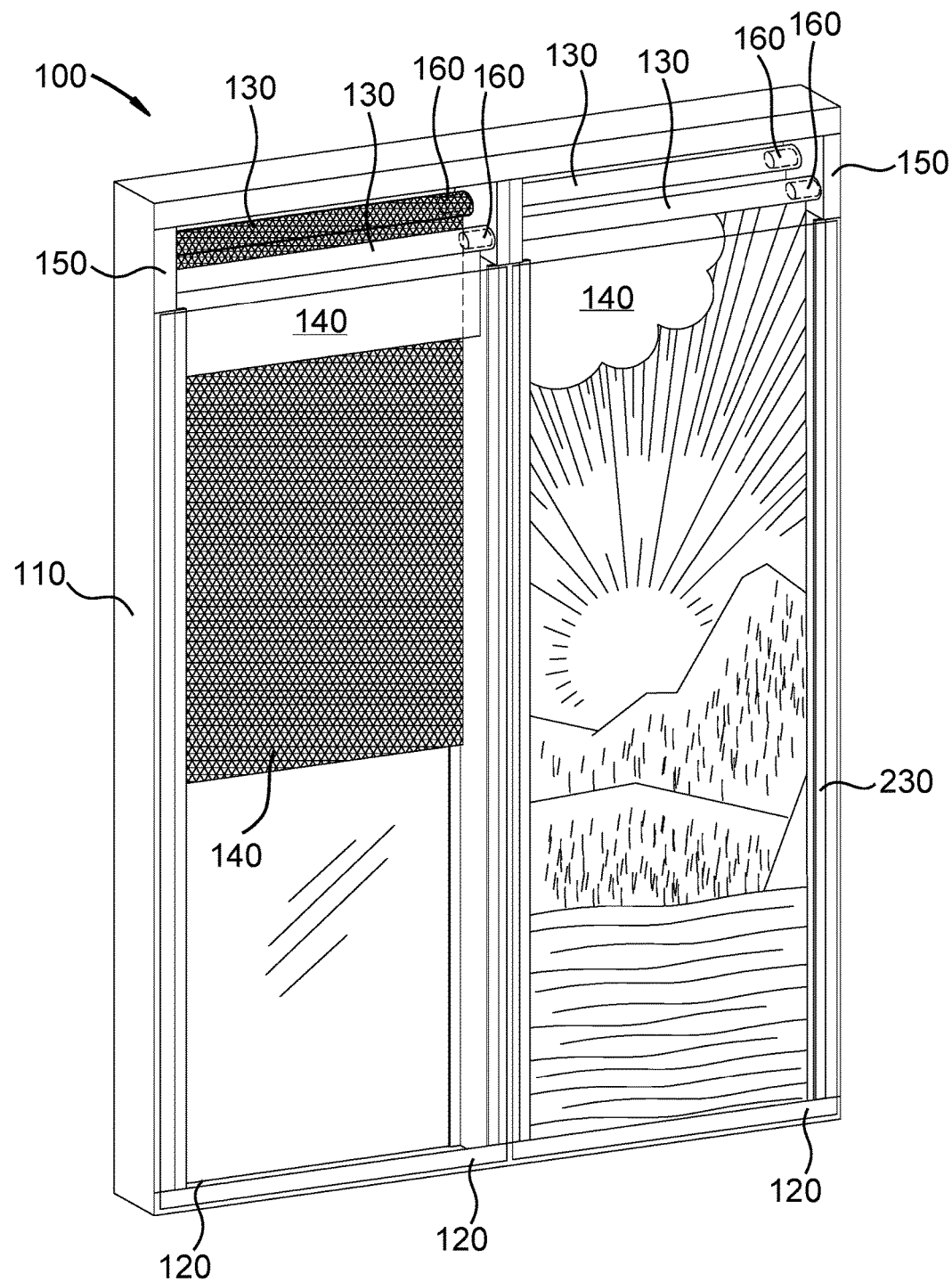
FIG. 5B depicts a film attached to each of the plurality of rollers such that when the plurality of rollers are selectively actuated, the films are selectively disposed within the interior space within the frame, juxtaposed behind the at least two glazed, transparent panes.

FIG. 5B depicts a film 140 attached to each of the plurality of rollers 130 such that when the plurality of rollers 130 are selectively actuated, the films 140 are selectively disposed within the interior space within the frame 110, juxtaposed behind the at least two glazed, transparent panes 120. Because the plurality of rollers 130 are selectively actuated, just one film 140 can be disposed within the interior space within the frame 110 at one time, or groups of two or more differing combinations of films 140 can be disposed within the interior space within the frame 110 at one time. The selection of films 140 to be disposed within the interior space within the frame 110 at any given time may be controlled by user preference or automation. In one embodiment, the plurality of rollers 130 are automatically actuated based on variables of time, amount of sunlight, weather, or temperature. For example, the system 100 may be programmed so that during cold, winter nights, one film 140 that blocks infrared radiation and one film 140 that blocks visible light are automatically disposed within the interior space within the frame 110, whereas during winter days, the two films 140 are withdrawn to let solar heat pass through. In one embodiment, the films 140 attached to the plurality of rollers 130 are disposed within the interior space within the frame 110 such that the films 140 completely fill a length and width of the frame 110. In one embodiment, the frame 110 comprises vertical tracks 230 that align the films 140. Each film 140 unrolls and extends downward, an edge of the film 140 running along inside the vertical tracks 230 so that the film 140 is secured in place. Separate sets of the vertical tracks 230 may be spaced, evenly or unevenly, along the frame 110 in order to space the films 140 within the interior space within the frame 110 in the case that more than one film 140 is disposed within the interior space at one time. The vertical tracks 230 prevent the films 140 from touching each other.

Figure 6A:
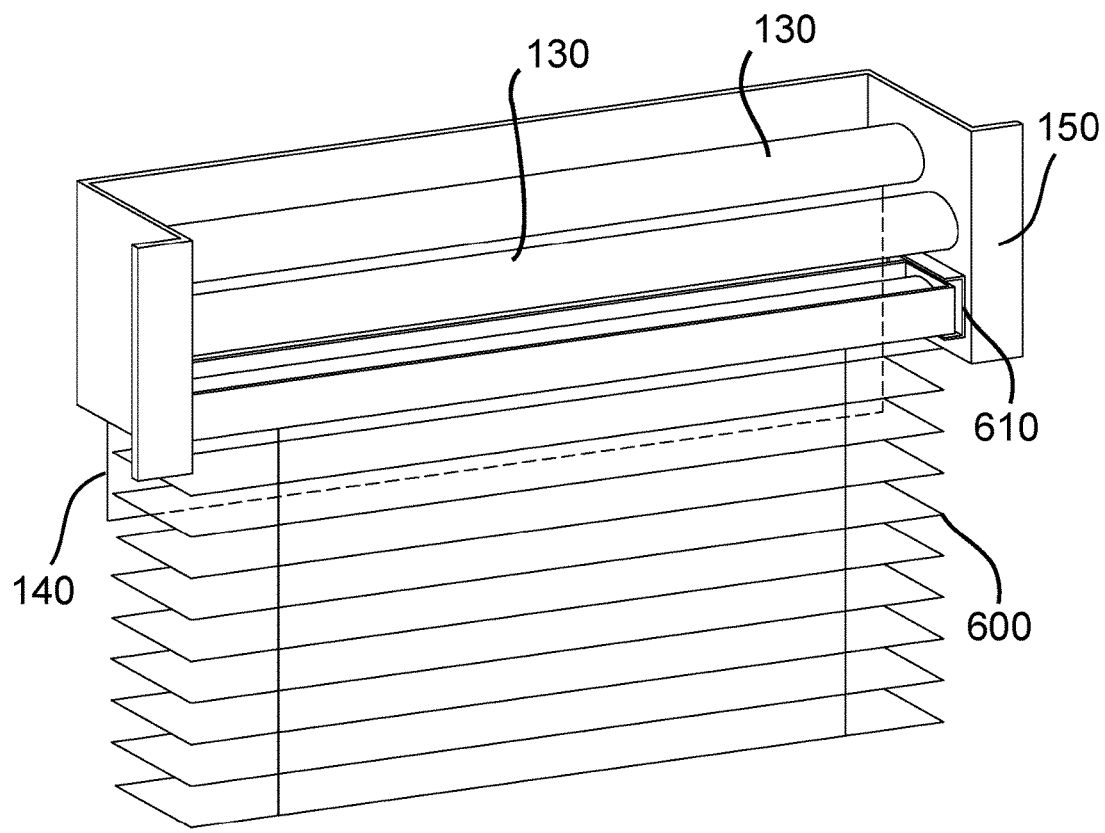
FIG. 6A depicts one embodiment of one or more window coverings mounted to the removable headboard.

FIG. 6A depicts one embodiment of one or more window coverings 600 mounted to the removable headboard 150. In one embodiment, the system 100 comprises one or more window coverings 600 mounted to the removable headboard 150 such that the one or more window coverings 600 are disposable within the interior space within the frame 110. In one embodiment, the one or more window coverings 600 comprise blinds, shades, or shutters. In other embodiments, the one or more window coverings comprise curtains or drapes. In a preferred embodiment, the one or more window coverings 600 comprise cellular shades. In a preferred embodiment, the one or more window coverings 600 are automated. The one or more window coverings 600 may be premanufactured for automation, be retrofit with an automating gearbox, or be automated by means of a central controller. They may be powered by battery, solar cells or electrical wiring. In one embodiment, the one or more window coverings 600 are actuated automatically based on variables of time, amount of sunlight, weather, temperature, or user preference. The one or more window coverings 600 can be opened or closed, or slats can be tilted varying determined degrees, according to a programmed schedule or according to spontaneous events or user inputs. In one embodiment, a user interface allows a user to give user inputs. In different embodiments, the user interface comprises voice control, buttons, switches, or a touch-sensitive display on a mobile device. In one embodiment, the one or more window coverings 600 extend a length of the removable headboard 150 and are mounted to the removable headboard 150 by means of mounting brackets 610 that are mounted to the removable headboard 150 at opposite sides of the removable headboard 150 by means of connectors. In one embodiment, the mounting brackets 610 are mounted below the plurality of rollers 130. In other embodiments, the mounting brackets 610 are mounted in between or above the plurality of rollers 130. Because the removable headboard 150 is removable, in the event that the one or more window coverings 600 malfunction, the removable headboard 150 can be easily removed to a more convenient location so that the malfunctioning one or more of the window coverings 600 can be easily replaced.

Figure 6B:
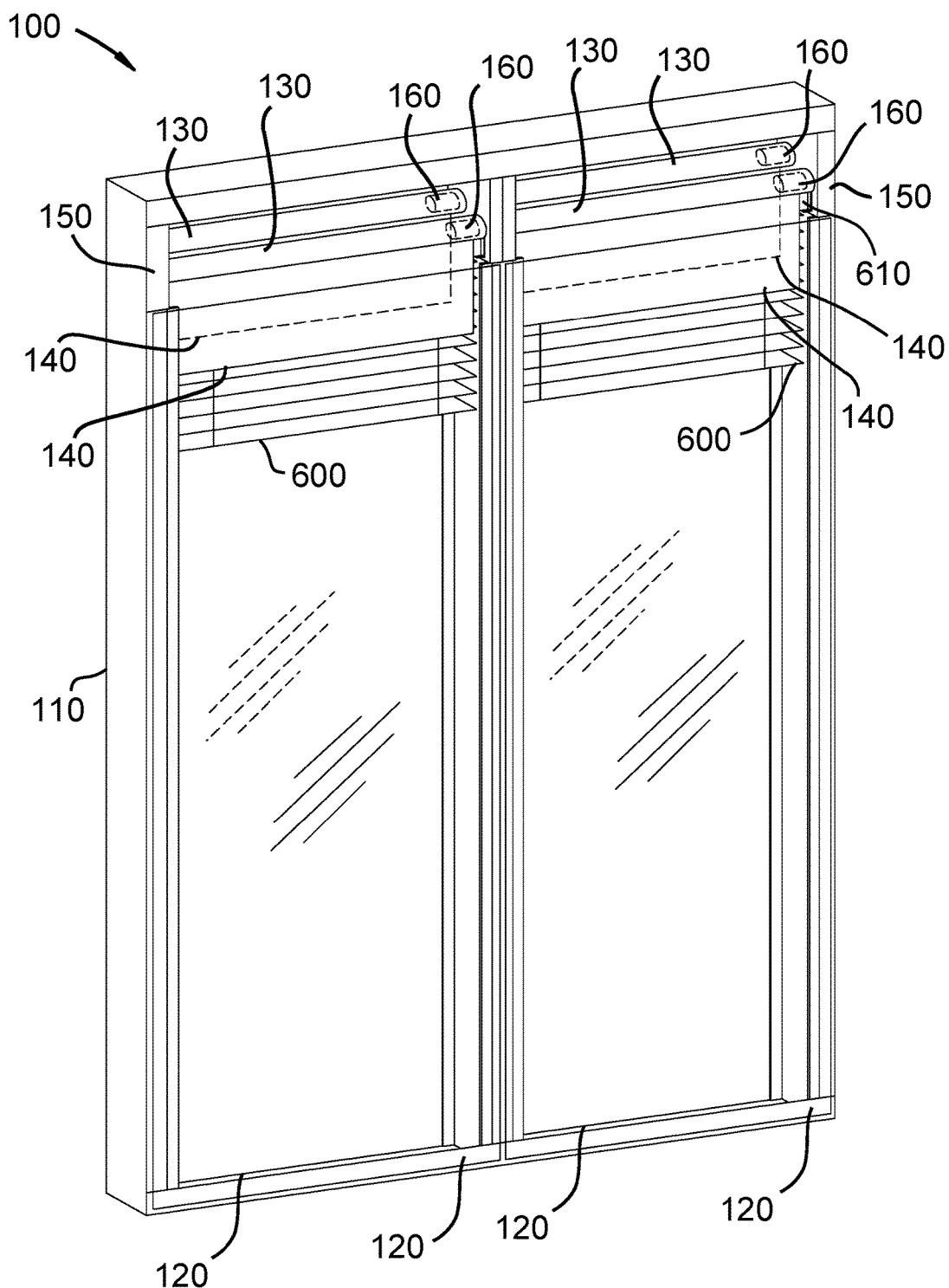
FIG. 6B depicts one embodiment of the system comprising one or more window coverings disposed within the interior space within the frame.

FIG. 6B depicts one embodiment of the system 100 comprising one or more window coverings 600 disposed within the interior space within the frame 110. In one embodiment, the system 100 comprises one or more window coverings 600 mounted to the removable headboard 150 such that the one or more window coverings 600 are disposable within the interior space within the frame 110. In a preferred embodiment, the one or more window coverings 600 are disposed within the interior space within the frame 110 such that the one or more window coverings 600 completely fill a length and width of the frame 110. The one or more window coverings 600 are juxtaposed behind the at least two glazed, transparent panes 120. In one embodiment, the one or more window coverings 600 may be, like the plurality of rollers 130, selectively actuated, such that just one window covering 600 is disposed within the interior space within the frame 110 at one time, or groups of two or more differing combinations of window coverings 600 are disposed within the interior space within the frame 110 at one time, or one window covering 600 and one film 140 are disposed within the interior space within the frame 110 at one time, or varying combinations of one or more films 140 and one or more window coverings 600 are disposed within the interior space within the frame 110 at one time. The selection of window coverings 600 and films 140 to be disposed within the interior space within the frame 110 at any given time may be controlled by user preference or automation. In one embodiment, the one or more window coverings 600 are actuated automatically based on variables of time, amount of sunlight, weather, temperature, or user preference. In different embodiments, the one or more window coverings 600 are disposed in front of the films 140, behind the films 140, or in between the films 140. In a preferred embodiment, one window covering 600 and two rollers 130 with films 140 attached are mounted to the removable headboard 150. The two films 140 comprise a blackout screen and a film that blocks short-wave infrared radiation. The window covering 600 is mounted such that it is disposed within the interior space within the frame 110 in between the two films 140. The films 140 and the window covering 600 are selectively actuated automatically according to programmed light, weather, and temperature patterns.

Figure 7:
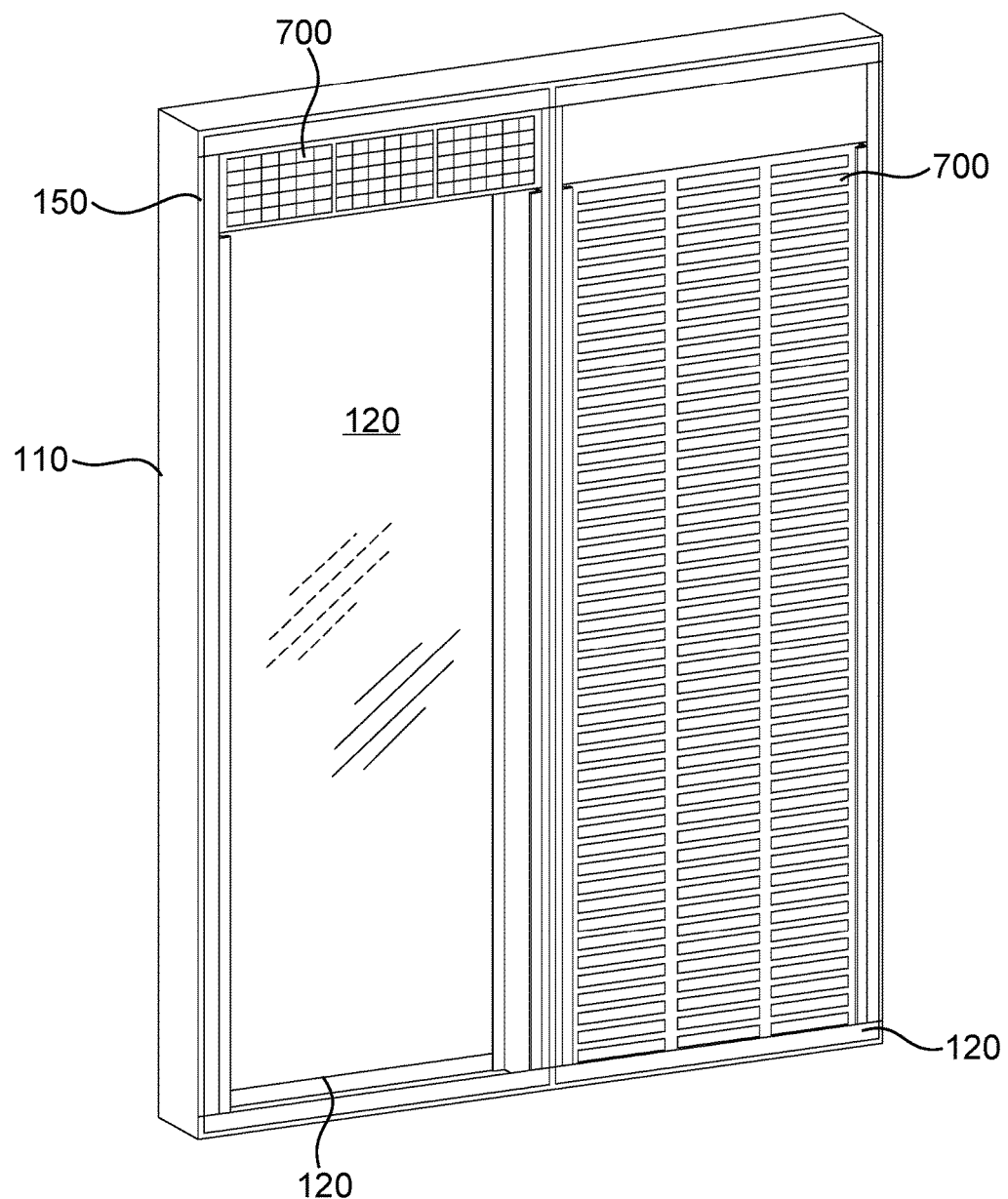
FIG. 7 depicts the system comprising solar cells.

FIG. 7 depicts the system 100 comprising solar cells 700. In one embodiment, the solar cells 700 are solar panels mounted to the frame 110. In a preferred embodiment, the solar cells 700 are mounted to an outside of the frame 110. In one embodiment, the solar cells 700 are mounted over a top portion of one glazed, transparent pane 120, covering the visible portion of the removable headboard 150 that can be seen through the glazed, transparent pane 120. In another embodiment, one of the films 140 comprises solar cells. One or more flexible steel sheets with solar cells 700 can be attached to one or more rollers 130, constituting a film 140. In embodiments that include solar cells 700, the energy generated from the solar cells 700 can be used to power the system 100. In one embodiment, the system 100 includes a controller that automates the system 100. The solar cells 700 can be connected to the controller such that the energy generated by the solar cells 700 powers the controller, which automates the system 100.

Figure 8:
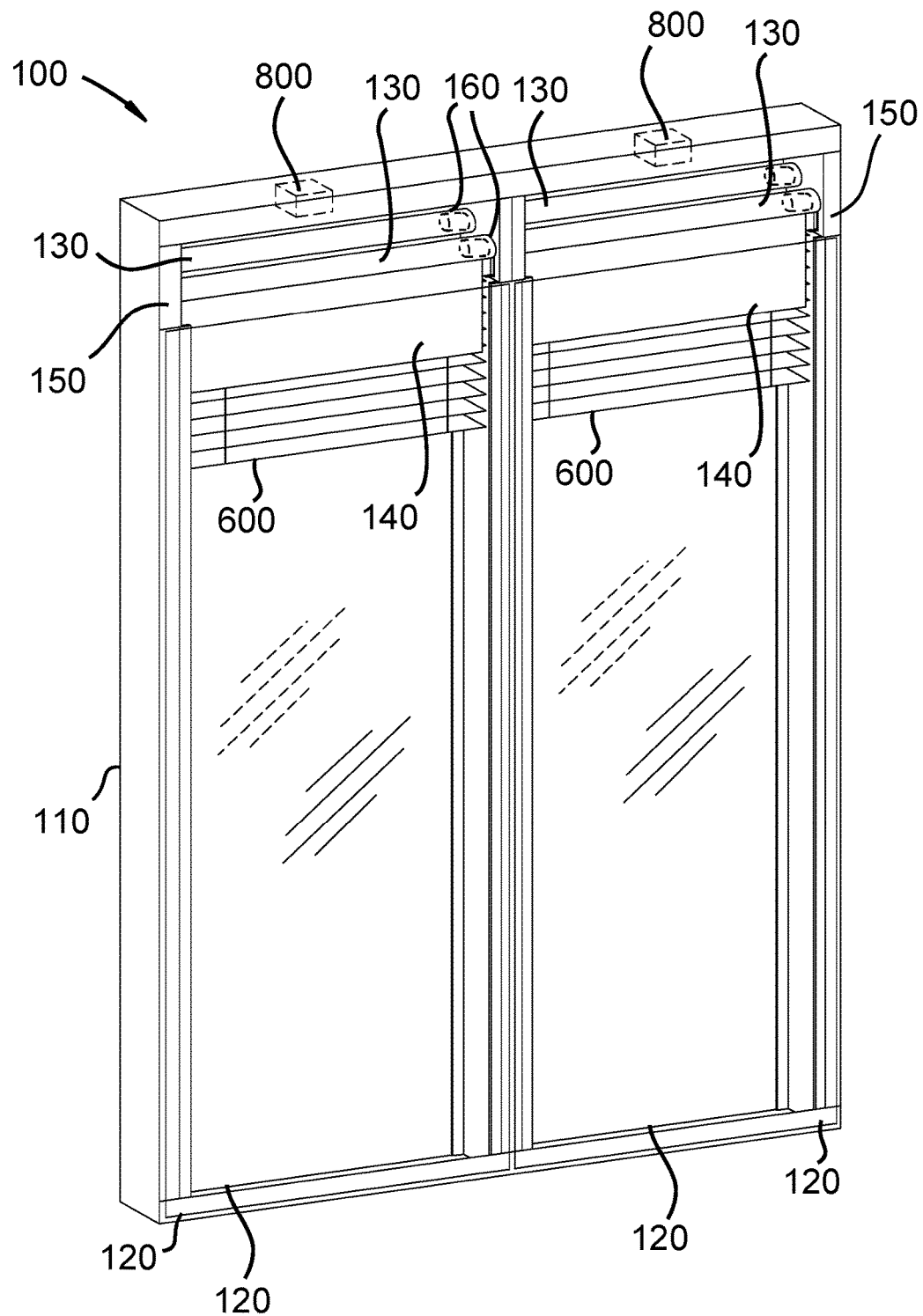
FIG. 8 depicts the system comprising a controller.

FIG. 8 depicts the system 100 comprising a controller 800. In a preferred embodiment, the system 100 comprises a controller 800 that actuates the plurality of rollers 130 automatically. In one embodiment, the plurality of rollers 300 are automatically actuated based on variables of time, amount of sunlight, weather, temperature, or user preference. In a preferred embodiment, the controller 800 also actuates the one or more window coverings 600 automatically. In one embodiment, the one or more window coverings 600 are actuated automatically based on variables of time, amount of sunlight, weather, temperature, or user preference. In one embodiment, a user interface allows a user to identify user preferences through user inputs. In different embodiments, the user interface comprises voice control, buttons, switches, or a touch-sensitive display on a mobile device. In different embodiments, the controller 800 is powered by battery, solar cells, or electrical wiring.

A preferred embodiment of the system 100 comprises one window covering 600 and two rollers 130 with films 140 attached to the rollers 130. The two films 140 comprise a blackout screen and a film that blocks short-wave infrared radiation. The window covering 600 is mounted such that it is disposed within the interior space within the frame 110 in between the two films 140. The films 140 and the window covering 600 are selectively actuated automatically according to programmed light, weather, and temperature patterns in the controller 800. For example, during a winter night, the window covering 600 and both films 140 are automatically rolled down and disposed within the interior space within the frame 110. However, during the winter day, the window covering 600 and both films 140 are rolled up to let light and radiation in. While watching a movie during the day, the window covering 600 and film 140 that acts as a blackout screen can be automatically rolled down while the film 140 that blocks infrared radiation is rolled up. During a summer night, window covering 600 and both films 140 are rolled down to keep light and heat out. However, during a summer day, the window covering 600 is rolled up to let light in, but both films 140 are rolled down to keep heat out. At any time the film 140 that acts as a blackout screen can be rolled down for privacy. The window covering 600 can be opened or closed, or slats can be tilted varying determined degrees, according to preprogrammed light schedules or user inputs. The controller 800 is programmed to recognize and implement each of these scenarios automatically.

In another embodiment, the system 100 comprises no window covering 600, but four films 140. Each film 140 blocks a different percentage of light. Each film 140 can be implemented alone or with varying combinations of the other three films 140, in order to allow a desired amount of light into a greenhouse. The controller 800 is programmed to automatically implement the varying combinations of films 140 at selected times. In still other embodiments, the controller 800 can be programmed to implement decorative films 140 at given holidays, ballistic films 140 when building occupants are absent, or movie screen films 140 when electronic devices are turned on, among other possibilities.

The invention claimed is:
1. A system comprising:
a frame comprising a removable headboard;
at least two glazed, transparent panes mounted to the frame, defining an interior space with the frame;
a plurality of rollers comprising motors mounted to the removable headboard; and
a film attached to each of the plurality of rollers such that when the plurality of rollers are selectively actuated, the films are selectively disposed within the interior space within the frame, between the at least two glazed, transparent panes.

2. The invention of claim 1, wherein the at least two glazed, transparent panes comprise at least one double-pane or at least one triple-pane comprising a sealed gap between panes of the double-pane or triple-pane.

3. The system of claim 2, wherein the sealed gap comprises argon or krypton.

4. The system of claim 2, wherein the sealed gap comprises a vacuum.

5. The system of claim 1, wherein the films comprise films that block fixed percentages of visible light.

6. The system of claim 1, wherein the films comprise films that partially or entirely block infrared radiation.

7. The system of claim 1, wherein the films comprise films that partially or entirely block ultraviolet radiation.

8. The system of claim 1, wherein the films comprise movie screens, whiteboard films, or decorative films.

9. The system of claim 1, wherein the films comprise ballistic films.

10. The system of claim 1, wherein the films comprise sound proofing films.

11. The system of claim 1, wherein the frame further comprises vertical tracks that align the films.

12. The system of claim 1, wherein the at least two glazed, transparent panes comprise glass.

13. The system of claim 1, wherein the at least two glazed, transparent panes comprise low-E coating.

14. The system of claim 1, further comprising solar cells.

15. The system of claim 1, wherein the frame is less than approximately five inches thick.

16. The system of claim 1, further comprising a controller that actuates the plurality of rollers automatically.

17. The system of claim 16, wherein the plurality of rollers are automatically actuated based on variables of time, amount of sunlight, weather, temperature, or user preference.

18. The system of claim 1, further comprising one or more window coverings mounted to the removable headboard such that the one or more window coverings are disposable within the interior space within the frame.

19. The system of claim 18, wherein the one or more window coverings comprise blinds, shades, or shutters.

20. The system of claim 18, wherein the one or more window coverings are actuated automatically based on variables of time, amount of sunlight, weather, temperature, or user preference.

* * * * *